J. HARRIS.
BEARING.
APPLICATION FILED OCT. 26, 1918. RENEWED JULY 30, 1919.
1,332,465.  Patented Mar. 2, 1920.
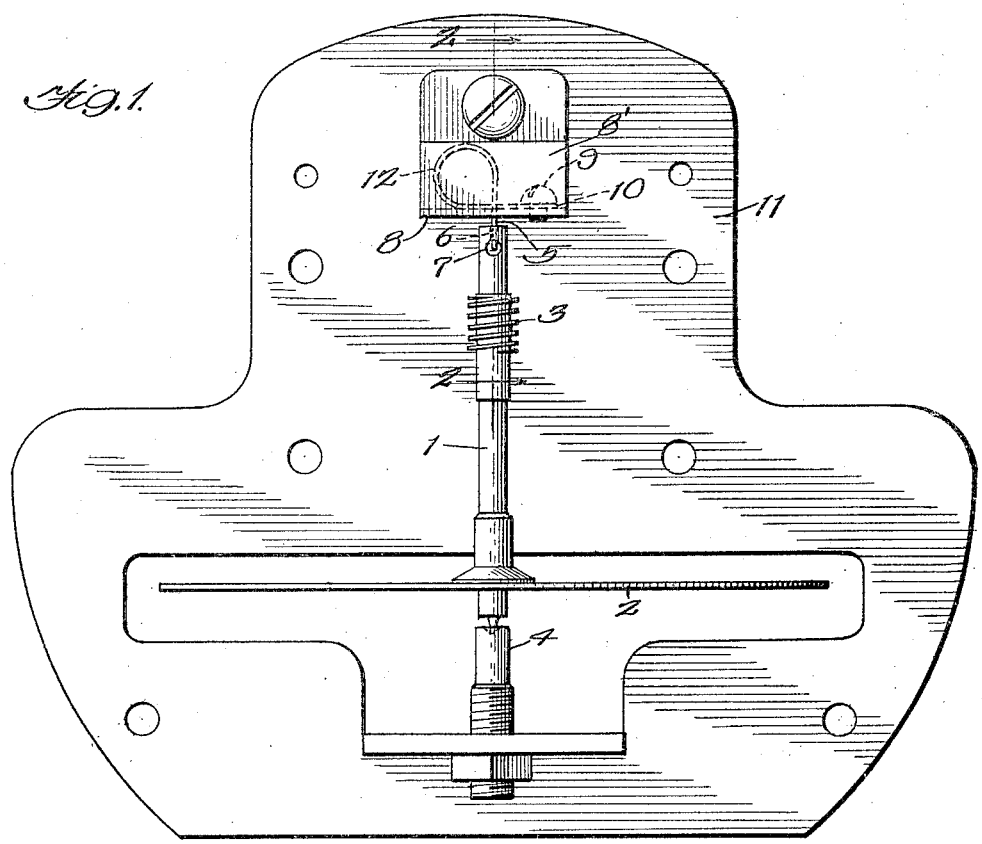
Fig. 1.
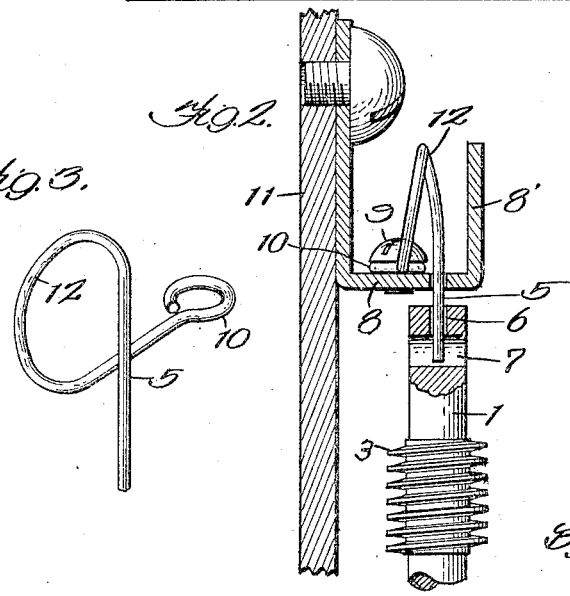
Fig. 2.
Fig. 3.
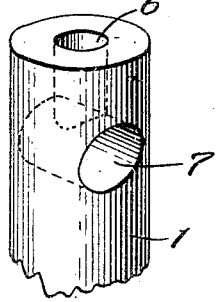
Fig. 4.
Inventor:
Jesse Harris.
By G. K. Gragg Atty.

UNITED STATES PATENT OFFICE.

JESSE HARRIS, OF LA FAYETTE, INDIANA, ASSIGNOR TO DUNCAN ELECTRIC MANUFACTURING COMPANY, OF LA FAYETTE, INDIANA, A CORPORATION OF ILLINOIS.

BEARING.

1,332,465.

Specification of Letters Patent.

Patented Mar. 2, 1920.

Application filed October 26, 1918, Serial No. 259,782. Renewed July 30, 1919. Serial No. 314,271.

*To all whom it may concern:*

Be it known that I, JESSE HARRIS, a citizen of the United States, residing at La Fayette, in the county of Tippecanoe and State of Indiana, have invented a certain new and useful Improvement in Bearings, of which the following is a full, clear, concise, and exact description.

My invention relates to bearings and is of particular use when employed at the upper end of the vertical spindle or shaft of an electricity motor meter. The class of bearings to which my invention particularly relates is that which includes lateral thrust bearings. Such a bearing comprises a spindle or shaft with a hole or recess in one end thereof extending along the spindle and a bearing pin anchored at one end and having its other end projecting in said recess.

My invention has for one of its objects the provision of an improved anchorage for such a bearing pin and for another of its objects an improved construction of the bearing pin that permits of the assembly of the spindle or shaft therewith after the pin has been anchored.

In carrying out the first object of my invention the bearing pin has its anchored end laterally extending from the part of the pin which is received by the spindle. In carrying out the second object of the invention the pin is of spring formation in whole or in part. While both of the objects of my invention may be achieved in one unitary structure I do not wish to limit the invention to a structure in which both objects are realized.

I will explain my invention more fully by reference to the accompanying drawing showing the preferred embodiment thereof and in which Figure 1 illustrates a portion of the motor element of a single phase induction alternating electric current meter; Fig. 2 is a view on line 2—2 of Fig. 1, on a larger scale; Fig. 3 is a perspective view of the bearing pin of my invention as it is preferably made; and Fig. 4 shows the preferred formation of the upper end of the meter spindle that receives the bearing pin.

Like parts are indicated by similar characters of reference throughout the different figures.

The upright spindle 1 carries a metallic disk 2 usually made of aluminum. This disk may be subject to the torque due to the coöperation of magnetic fields that are produced by windings respectively subject to alternating current and the pressure thereof and may also operate within the field of a permanent magnet properly to regulate the rate of rotation of the disk and the spindle which carries it. The spindle may be provided with a worm 3 in driving relation to the usual counting train, not shown. The lower end of the spindle is stepped into a lower end thrust bearing 4 which is given a working position which is usually determined in the manufacture of the meter and which working position is not frequently modified when the meter is in service.

The bearing at the upper end of the spindle includes a pin 5 having one end projecting within a recess 6 formed in the upper end of the spindle 1 and extending along the same to be co-axial therewith. The transverse channel 7 extends through the spindle to prevent the accumulation of any foreign matter about the bearing pin. The other end of the bearing pin is anchored to a bracket 8 by means of a screw 9 which is surrounded by the eye 10 formed at the anchored end of the pin. The bracket 8 is secured to the motor support 11 of the meter and is desirably upturned as indicated at 8' at the front edge of the bracket to guard the bearing pin.

The bearing pin is desirably formed of a slender rod or wire formed of suitable spring metal such as steel and is curled or bent throughout an intermediate portion of its length as indicated at 12. The curled portion 12 of the bearing pin is tangential at one end with the upright straight portion of the pin that is received in the recess 6. This curled portion 12 is tangential at its other end with the horizontal portion of the pin that terminates in the anchoring eye 10. The curled portion of the pin is thus laterally placed with respect to the upright straight portion thereof, the part 10 of the pin being also laterally disposed with respect to this straight pin portion. This arrangement permits of the anchorage of the pin closer to the plane of the upper end of the spindle and allows the straight part of the pin to be moved longitudinally of the axis of rotation of the spindle and also with respect to the spindle longitudinally thereof.

In assembling the spindle the upper end thereof may be initially placed in reception of the bearing pin, and the bottom of the recess 7, which is also the bottom of the recess 6, may be engaged with the lower end of the pin by the upward movement of the spindle which movement is made sufficient to permit the lower end of the spindle to be engaged within the lower bearing. The bearing pin may be sufficiently flexed in this adjustment of the spindle to permit the lower end of the spindle to clear the lower bearing and when the lower end of the spindle has been placed in alinement with the bearing the spindle is lowered, being partially followed in its lowering movement by the upper bearing pin, the lower end of which is preferably normally clear of the spindle.

If it should be desired to remove the spindle at any time the assembling movement thereof just described is reversed. It will be observed that the upper bearing pin permits of the assembling and disassembling movements of the spindle without disturbing the anchorage of the pin. It is apparent that the spindle may also be assembled with its bearings when the upper bearing pin is lifted by grasping its curled portion 12 to lift the straight portion of the pin sufficiently to clear the spindle and subsequently bring the recess 6 thereof in alinement with the straight pin portion whereafter this pin portion may be permitted to enter the adjacent recess in the spindle.

The hole in the support 8 into which the wire bearing passes limits the distance which the pin may be moved or thrust laterally so as not to permit the spring to be "set". Said spring therefore always returns to the axis of the hole without difficulty. If no hole were there, or such a hole were too large, the wire bearing if accidentally thrust too far to one side, would take a set and put the meter out of commission. Further, if the hole in the support 8 were so small that it virtually constantly touched the pin the wire bearing would then be relieved of its resilience or flexibility which absorbs the vibrations and resulting in the humming of the moving element during operation.

While I have shown one form of pin made throughout of spring wire and have illustrated one peculiar formation of the pin to impart such flexibility thereto that will permit the spindle engaged portion thereof to be moved longitudinally of the normal axis of rotation of the spindle, I do not wish to be limited to the precise characteristics illustrated as changes may readily be made without departing from the spirit of my invention, but having thus described my invention I claim as new and desire to secure by Letters Patent the following:—

1. The combination with an upright spindle provided at its upper end with a recess extending along the spindle; of an end thrust bearing engaging the lower end of the spindle; and an upper bearing pin projecting within said recess and having a spring portion included in its formation that permits the part of the pin received in the spindle to be moved longitudinally of the axis of rotation of the spindle.

2. The combination with an upright spindle provided at its upper end with a recess extending along the spindle; of an end thrust bearing engaging the lower end of the spindle; an upper bearing pin projecting within said recess and having a spring portion included in its formation that permits the part of the pin received in the spindle to be moved longitudinally of the axis of rotation of the spindle, the end of the bearing pin received in said recess being also movable with respect to the spindle longitudinally thereof; and an anchorage device for the other end of the pin.

3. The combination with an upright spindle provided at its upper end with a recess extending along the spindle; of an end thrust bearing engaging the lower end of the spindle; and an upper bearing pin formed of spring wire projecting within said recess and curled at an intermediate portion that permits the part of the pin received in the spindle to be moved longitudinally of the axis of rotation of the spindle.

4. The combination with an upright spindle provided at its upper end with a recess extending along the spindle; of an end thrust bearing engaging the lower end of the spindle; an upper bearing pin formed of spring wire projecting within said recess and curled at an intermediate portion that permits the part of the pin received in the spindle to be moved longitudinally of the axis of rotation of the spindle, the end of the bearing pin received in said recess being also movable with respect to the spindle longitudinally thereof; and an anchorage device for the other end of the pin.

5. The combination with an upright spindle provided at its upper end with a recess extending along the spindle; of an end thrust bearing engaging the lower end of the spindle; an upper bearing pin formed of spring wire projecting within said recess, the end of the bearing pin received in said recess being also movable with respect to the spindle longitudinally thereof; and an anchorage device for the other end of the pin which is laterally disposed with respect to the pin portion received by the spindle.

6. The combination with an upright spindle provided at its upper end with a recess extending along the spindle; of an end thrust bearing engaging the lower end of the spindle; an upper bearing pin projecting within said recess, the end of the bearing pin received in said recess being also movable with respect to the spindle longitudinally thereof; and an anchorage device for the other end of the pin which is laterally disposed with respect to the pin portion received by the spindle.

7. The combination with an upright spindle provided at its upper end with a recess extending along the spindle; of an end thrust bearing engaging the lower end of the spindle; an upper bearing pin formed of spring wire projecting within said recess and curled at an intermediate portion that permits the part of the pin received in the spindle to be moved longitudinally of the axis of rotation of the spindle, the end of the bearing pin received in said recess being also movable with respect to the spindle longitudinally thereof; and an anchorage device for the other end of the pin which is laterally disposed with respect to the pin portion received by the spindle.

8. The combination with an upright spindle provided at its upper end with a recess extending along the spindle; of an end thrust bearing engaging the lower end of the spindle; an upper bearing pin projecting within said recess; and an anchorage device for the other end of the pin which is laterally disposed with respect to the pin portion received by the spindle.

In witness whereof, I hereunto subscribe my name this 22nd day of October, A. D. 1918.

JESSE HARRIS.